United States Patent [19]
Katz et al.

[11] 3,900,034
[45] Aug. 19, 1975

[54] PHOTOCHEMICAL STIMULATION OF NERVES

[75] Inventors: Joseph J. Katz, Chicago; Thomas R. Janson, Joliet, both of Ill.

[73] Assignee: The United States of America as represented by the United States Energy Research and Development Administration, Washington, D.C.

[22] Filed: Apr. 10, 1974

[21] Appl. No.: 459,756

[52] U.S. Cl. .............................. 128/395; 331/94.5
[51] Int. Cl.² .......................................... A61N 1/00
[58] Field of Search ........... 128/395, 396, 418, 419; 331/94.5

[56] References Cited
UNITED STATES PATENTS

| | | | |
|---|---|---|---|
| 3,456,651 | 7/1969 | Smart | 128/395 |
| 3,596,662 | 8/1971 | Bolduc | 128/418 |
| 3,796,220 | 3/1974 | Bredemeier | 128/395 |

OTHER PUBLICATIONS

Goldman, "Lasers in Medicine," Gordon & Breach, Science Publishers, pp. 216.

*Primary Examiner*—Richard A. Gaudet
*Assistant Examiner*—Henry S. Layton
*Attorney, Agent, or Firm*—Dean E. Carlson; Arthur A. Churm; Robert J. Fisher

[57] ABSTRACT

A method is provided for stimulating a nerve or a severed nerve by placing a low power laser, preferably a photodiode laser, near the nerve and irradiating the nerve with the output from the laser. An end organ response is elicited upon irradiation of the attached nerve fiber. The output from the laser is of a nondestructive intensity such that the nerve and the tissue surrounding the nerve are not injured. The photochemical stimulation of the nerve is enhanced by staining the nerve to be stimulated with a sensitive, vital stain prior to the laser irradiation of the nerve.

8 Claims, 1 Drawing Figure

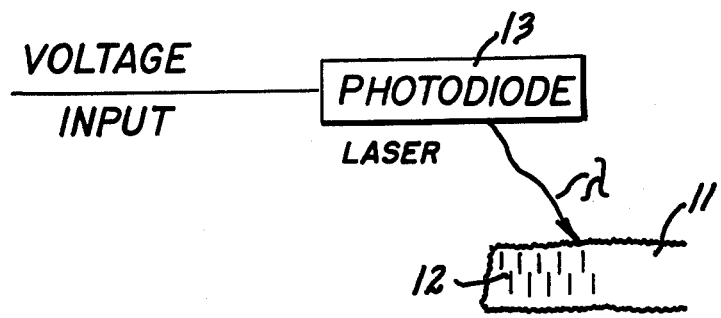

PHOTOCHEMICAL STIMULATION OF NERVES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Many advances in the medical field in recent years can be attributed to the adaptation of the knowledge and advances made in other scientific fields and to the sophistication of electronics technology. In particular, the field of neurology has been advanced significantly by discoveries in the areas of biomedical engineering and electronics technology. The application of technological developments in these areas has served to simplify and assist complex neurosurgical and neurophysiological techniques presently used and promises to assist the development of newer, more modern procedures. For example, articles have appeared in recent literature suggesting methods for correcting "dropfoot" by electrical stimulation, possible treatments of stomach ulcers by stimulations of certain regions of the brain, surgically implanted, patient-controlled devices for jamming pain signals, the use of implanted tantalum disks to stimulate nerves and muscles without accompanying oxidation-reduction reactions and implantation of electrodes to stimulate cardiac muscle in patients with diseased or damaged hearts. The use of implanted electrodes, however, presents a problem, as the electrodes can cause local tissue irritation when implanted. Therefore, it is highly desirable to devise a means for stimulation which does not require implanted electrodes.

Accordingly, it is an object of the present invention to provide a method for stimulating a nerve.

It is another object of the present invention to provide a method for stimulating a nerve which will eliminate the necessity for surgical implantation of electrodes or the penetration into body tissue of conducting wires.

Another object of the present invention is to provide a method for stimulating a nerve without injuring the nerve tissue or other tissue surrounding the nerve.

Another object of the present invention is to provide a method for stimulating a nerve which is not easily accessible by surgery.

It is an additional object of the present invention to provide a method for stimulating a nerve other than by direct electrical stimulation, which method will operate under physically benign conditions, eliminating any resultant tissue damage due to the implantation of electrodes.

BRIEF DESCRIPTION OF THE DRAWING

Other objects of the present invention will become apparent upon reading the following description and with reference to the drawing which is a schematic representation of the photochemical stimulation of a nerve.

SUMMARY OF THE INVENTION

The present invention relates to a method for stimulating a nerve. In accordance with the present invention, a nerve is photochemically stimulated by placing a low-power laser, preferably a photodiode laser, near the nerve and irradiating the nerve with the output from the laser. The photodiode laser has an output of a nondestructive intensity such that the nerve tissue and the tissue surrounding the nerve are not injured. The stimulation of the nerve can be enhanced by staining the nerve to be stimulated with a sensitive, vital stain prior to the laser irradiation. A particular laser which has been found to be effective in the practice of the present invention is a zinc-coated gallium arsenide injection photodiode laser.

DESCRIPTION OF THE INVENTION

In accordance with the present invention, a nerve is stimulated by irradiating the nerve tissue with the photo-output of a low-power laser. Irradiation of the nerve tissue with the photo-output of the laser elicits an end organ response, i.e., a neuro-muscular response. In other words, a response is invoked in muscle tissue by the low-power laser irradiation of the attached nerve fiber. The nerve to be stimulated can be either an intact nerve or one which has been severed, creating disjoint nerve endings. In the case of a severed nerve, the nerve fragment attached to the muscle is irradiated. Since the nerve is to be stimulated directly with radiation from the laser and the output of the laser will impinge directly upon the tissue, it is essential that the output of the laser have a nondestructive intensity. If the intensity of the laser is above a certain critical value, the laser will burn through the nerve and destroy the tissue rather than stimulate it. Therefore, if the laser is of too high a power, it is necessary that the output be diffused prior to the radiation impinging on the nerve tissue. While lasers which have a high power can be used by diffusing the output, this diffusion of the laser output is wasteful and highly undesirable. Therefore, use of a photodiode laser which has a nondestructive intensity is highly preferred. The term "nondestructive intensity" as used herein is defined as an intensity such that there is no damage to the nerve or surrounding tissues. While it is possible that there is an actual limit on the intensity or a range above which damage to tissue will occur, what parameters this intensity limit or range may have are not known at present and for purposes of the present invention are not needed. It is only necessary that the intensity of the laser radiation falling on the nerve and surrounding tissue do no damage to the nerve or surrounding tissue.

Photodiode lasers which have been developed in recent years have been found to be particularly effective for the practice of the present invention. Photodiode lasers have the additional advantage that they have a very small structure. The injection photodiode lasers of concern in the present invention should not be confused or equated with more common light-emitting-diodes. Light-emitting-diodes (LED's) are solidstate devices which convert electrical energy into electromagnetic radiation, a part or all of which is in the visible portion of the spectrum. A photodiode laser, on the other hand, is composed of materials which form a heterojunction and, following excitation, will emit coherent monochromatic electromagnetic radiation. The photodiode laser device operates by allowing electric current to pass through in one direction only, offering high electrical resistance in the opposite direction. A junction within the diode is formed by the deposition of a thin layer of a conducting material onto a crystal of a semiconducting compound. This junction diode permits current to flow more readily in the direction from the conductor to the semiconductor and the lasing action occurs at the junction region. When electrons in the semiconductor crystal are stimulated by electrical energy, they fall from the upper energy states to lower ones, emitting coherent monochromatic radiation in the process. A particular photodiode laser which has been found to be extremely effective in the practice of the present invention is zinc-coated gallium arsenide. This photodiode laser is prepared by depositing a thin layer of zinc onto a gallium arsenide crystal.

Other photodiode lasers can also be used in applications of the present invention, there being other such solid-state devices which are capable of emitting light in the ultraviolet, visible, and infrared regions with application of suitable voltages which may be reasonably low. Such devices can serve as very convenient sources of photoenergy, since they are durable, stable, and precise. Furthermore, their small size is readily adaptable to future applications in terms of portability.

While it was shown that the nerves were readily stimulated upon irradiation by the photodiode laser, it has further been found that the stimulation of the nerve is greatly enhanced by introducing a photosensitizer into the nerve tissue. A photosensitizer is usually a strongly colored substance that absorbs longer wavelengths than a base material or "substrate" and which causes enhanced response of a chemical, optical, electrical or biological system to light. An effective photosensitizer, of course, is not destroyed during the photo-process. In using this technique in the practice of the present invention, the photosensitizer is introduced into the nerve tissue by staining the nerve with a sensitive, vital stain prior to irradiation with the laser. The terms "stain" and "staining" are used herein in preference to acceptable terms "dye" and "dyeing," respectively. The term "vital stain" as used herein is used in the same sense as the term is used in the art, that is, a vital stain is one which will stain living tissue without killing the tissue. In other words, a vital stain will stain living tissue without impairing the biological function. The term "sensitive" used in connection therewith is intended to convey the interaction between the output of the laser and the photosensitizing agent. The stain will be sensitive to light of the same wavelength as the output of the laser. Stains or dyes are available which will absorb radiation in the infrared, visible and ultraviolet and the choice of the stain is based upon the output of the particular laser being used. For example, the zinc-coated gallium arsenide photodiode laser which has been found to be particularly useful in the practice of the present invention has an output in the near infrared spectrum, and therefore the nerve to be stimulated is stained with a sensitive, vital stain which absorbs light in the near infrared.

Unfortunately, there are only a limited number of suitable vital stains available which absorb light in the near infrared. However, a wide variety of vital stains which absorb light in the visible spectrum are available. In order to more clearly demonstrate the enhancement of the neuro-muscular response by staining the nerve tissue with a vital sensitive stain, tests were conducted using several of the stains which absorb in the visible spectrum. Although injection photodiode lasers which emit in the visible are expected to be commercially available in the near future, no such laser was readily available for use in these tests. Therefore, another low-power laser, a helium-neon gas laser, was used. The helium-neon gas laser gave good results in demonstrating enhanced neuro-muscular response upon staining the nerve tissue. The output of the helium-neon gas laser is of a nondestructive intensity and the output spectrum of this laser is in the visible region. An organic glue stain has been found to be particularly effective with a helium-neon gas laser. Therefore, when the photodiode lasers emitting in the visible spectrum are available, the stimulation of the nerve upon irradiation by the photodiode laser will be enhanced by staining the nerve tissue with a stain which absorbs in the visible spectrum at the wavelength emitted by the photodiode laser.

When a vital sensitive stain is used in conjunction with a photodiode laser, a larger portion of the energy emitted by the photodiode is, of course, transmitted to the nerve. The photoenergy emitted from the diode is coupled to the nerve via the selected chemical stain. The stains which are used will be selected on the basis of their photoabsorption characteristics and also on their ability to form a cooperative union with the nerve tissue. Such a union would necessitate that the stain be fixed by the nerve components.

Photochemical stimulation of a nerve in accordance with the method of the present invention is schematically represented in the drawing. The nerve fiber 11 is stained with a suitable sensitive vital stain 12, which stain is sensitive to the output of the particular laser used. A voltage is applied to a photodiode laser 13 which is placed close to nerve 11 which is to be stimulated. The laser will subsequently emit a pulse of monochromatic light illustrated in the drawing by the arrow labeled lambda. The output of the laser impinges on nerve fiber impregnated with the chemical stain and the light energy is absorbed by the chemical stain and transferred to the nerve, thus stimulating the nerve. In such a manner, a nerve impulse can be initiated by applying the necessary input to the photodiode laser.

Experiments were conducted to demonstrate the method of the present invention. The first experiments recorded action potentials, due to photostimulation from a gallium arsenide semiconductor diode, obtained from nerve muscle preparations obtained from adult frogs (*Rana pipiens*). The bioelectric and photobioelectric properties of the sciatic nerve with a fully innervated gastrocnemius muscle intact were studied as an in vitro system. Stimulation of a nerve was detected by both visual observation of the muscle for a muscle contraction, i.e., a muscle twitch, and more accurately, by measuring the surface potentials of the muscle, a change in the potential indicating stimulation. In this way an end organ response to irradiation of the nerve could be demonstrated. The sciatic nerve and the innervated gastrocnemius muscle were removed as a unit from adult *Rana pipiens* and the freshly excised nerve-muscle systems were immediately immersed in frogs' Ringer's solution. Ringer's solution, a term well known kn the art, is a saline solution which approximates the blood composition. In these particular cases, the frogs' Ringer's solution prepared consisted of 6.43 grams sodium chloride, 0.30 gram potassium chloride, 0.17 gram calcium chloride, 0.36 gram sodium bicarbonate, and 0.71 gram glucose in 1 liter of water. During the course of an experiment care was taken to keep the nerve-muscle preparation moist with cold Ringer's solution. Each preparation was checked for viability before an experiment was conducted utilizing that specimen. Depending on a number of factors involved in the handling of the preparation, the nerve muscle preparation will remain viable for up to 48 hours. In a typical experiment, the laser beam is focused about 2 mm from the center of the sciatic nerve and the laser unit is switched on. When the photodiode laser is used, a pulsing unit is switched on, as the photodiode laser must be operated in a pulsed mode. No surface potentials are observed in the muscle for the first 4 to 5 minutes after the laser has been turned on. After this time, some small irregular potentials become visible and for several minutes the intensity of these increasingly regular potentials grows. After approximately 15 to 20 minutes, the potentials appear to have reached a maximum intensity and regularity. The process then appears to reverse itself and, after about 30 minutes of irradiation, only small sporadic potentials are observable. Visible contraction of the gastrocnemius muscle was repeatedly observed in a number of experiments involving photostimulation of the sciatic nerve. The complex photobioelectric reaction which takes place appears to be time-dependent, because visible twitching of the muscle appeared usually 3 minutes after the onset of laser irradiation of the nerve.

Other experiments were run to demonstrate that stimulation of the nerve was, in fact, a result of the laser photostimulation. Extended lag times between the initiation of laser irradiation and the detection of a surface potential were shown to be associated with nerve muscle preparations which were stored in a cold room for periods of over 1 hour or were dissected out of frogs which appeared to be of questionable health. Healthy frogs responded quickly and intensely to the stimulation.

Investigations have shown that the use of certain organic stains, vital sensitive dyes, increases the sensitivity of the nerve cells to laser stimulation. Staining a nerve cell with certain vital stains results in a more rapid electrical response and an increased intensity of the potentials. Application of blue stain has resulted in particular increased intensity and regularity of peaks. Very sharp and prominent action potential signals resulted from laser irradiation of the sciatic nerve when it was stained with 1 percent methylene blue. The methylene blue stained preparation provided more noticeable activity under the same laboratory conditions as an unstained preparation and this indicates that the stain has enhanced absorption of the laser light.

Other experiments were conducted using a helium neon gas laser. The particular laser used was a Spectra Physics helium neon gas laser (Model 134) the output of which is in the visible region. The Model 134 has a power output of 3 milliwatts or less and emits in the visible red region at a wavelength of 632.8 nanometers. When the helium neon laser was used to stimulate the sciatic nerve, an electrical response, although somewhat weaker and more sporadic than the response elicited using the diode laser, was detected. The first small peaks were evident after only about 3 minutes of irradiation. The peaks progressively increased in intensity to a maximum of about 3 millivolts, although occasionally very large, up to 6 millivolts, single spikes or groups of spikes being visible. After about 20 minutes of irradiation, the process began to reverse itself, following a pattern similar to that observed with a diode-irradiated nerve. Convulsions of the muscle were visible at all times while surface potentials were detected. The nerve muscle preparation transmitted signals for approximately 60 minutes. This represents nearly a twofold increase in the duration of viability while being irradiated over that of a diode-irradiated nerve preparation. It was found that certain of the organic stains increased the sensitivity of the nerve cells to stimulation by the visible emitting laser also. Similarly, there was a reduction in the lag time when an organic stain was used. While the application of blue stains resulted in an increased intensity and regularity of the peaks, there also seemed to be a correlation between the wavelength of the emitted helium-neon laser radiation and the degree of absorption by the stain at the wavelength of the incident laser radiation. Two stains, Janus Green B and Methylene Blue, have been found to give very good to excellent results, while Evans Blue, Trypan Blue, Nile Blue A and Brilliant Cresyl Blue have also given good results. Only fair results were obtained with Crystal Violet and Brilliant Vital Red gave poor results.

Photochemical stimulation of a nerve using a laser was also demonstrated for mammals by irradiating the vagus nerve of hamsters. In a typical experiment, the hamster was anesthetized and placed on an animal board. The trachea was exposed and cannulated to prevent respiratory complications. The right vagus was exposed by blunt dissection lateral to the trachea and was enclosed in a sheath of connective tissue along with the carotid artery. The vagus was separated from the surrounding tissue and placed on teflon tape. The preparation was kept moist by the addition of 0.9 percent saline solution. The laser was positioned above the nerve and stimulation begun. Stimulation of the vagus nerve can be readily detected by its effect on the heart. Experimental results have been obtained which indicate that the vagus nerve in mammals is indeed stimulated by the laser irradiation. Distorted electrocardiographs were obtained from golden hamsters whose vagus nerves were irradiated with infrared radiation from a photodiode laser. Experiments also demonstrated a 5 percent reduction in the heart rate of the hamster.

The embodiments of the invention in which an exclusive property or privilege is claimed are defined as follows:

1. A method of stimulating a nerve comprising: placing a photodiode laser near said nerve; and irradiating said nerve with the output from said photodiode laser, said photodiode laser having a nondestructive intensity; whereby said nerve is stimulated.

2. A method of photochemically stimulating a nerve in accordance with the method of claim 1 wherein said nerve to be stimulated is stained with a sensitive vital stain prior to said laser irradiation.

3. The method in accordance with claim 2 wherein said photodiode laser emits light and said stain absorbs light in the near infrared spectrum.

4. A method of photochemically stimulating a nerve comprising: staining said nerve to be stimulated with a sensitive vital stain, which stain absorbs light in the visible spectrum; placing a helium-neon gas laser near said nerve, said helium-neon gas laser having an output spectrum in the visible region; and irradiating said nerve with the output from said laser, said output being of a nondestructive intensity; whereby said nerve is stimulated.

5. The method in accordance with claim 4 wherein said stain is an organic blue stain.

6. A method of photochemically stimulating a nerve without injuring said nerve tissue or the tissue surrounding said nerve comprising: staining said nerve to be stimulated with a sensitive vital stain; placing a low-energy photodiode laser near said nerve; pulsing said photodiode laser; irradiating said nerve with the output of said photodiode laser, said output being of a nondestructive intensity; whereby said nerve is stimulated.

7. The method in accordance with claim 6 wherein said photodiode laser is zinc-coated gallium arsenide.

8. The method in accordance with claim 6 wherein said sensitive vital stain is selected from the group consisting of Janus Green B, Methylene Blue, Trypan Blue, Brilliant Cresyl Blue, Nile Blue A, and Crystal Violet.

* * * * *